(12) United States Patent
Palmquist

(10) Patent No.: US 7,046,137 B2
(45) Date of Patent: May 16, 2006

(54) DELIVERY OF EMBEDDED INFORMATION IN A SELECTED FORMAT

(75) Inventor: Robert Palmquist, Faribault, MN (US)

(73) Assignee: Speechgear, Inc., Northfield, MN (US)

( * ) Notice: Subject to any disclaimer, the term of this patent is extended or adjusted under 35 U.S.C. 154(b) by 418 days.

(21) Appl. No.: 10/280,296

(22) Filed: Oct. 24, 2002

(65) Prior Publication Data

US 2004/0083212 A1    Apr. 29, 2004

(51) Int. Cl.
G08B 1/08    (2006.01)

(52) U.S. Cl. .............................. 340/539.11; 340/572.1; 340/573.1

(58) Field of Classification Search ............. 340/539.1, 340/539.11, 539.13, 539.15, 572.1, 572.4, 340/572.6, 573.1, 10.1; 235/380, 382.5, 235/385, 462.45, 462.46; 370/329, 342; 705/1, 6, 22

See application file for complete search history.

(56) References Cited

U.S. PATENT DOCUMENTS

| | | | | |
|---|---|---|---|---|
| 5,436,436 | A | | 7/1995 | Matsukawa .................. 235/380 |
| 5,442,344 | A | * | 8/1995 | Merkle et al. ................. 705/22 |
| 5,455,409 | A | * | 10/1995 | Smith et al. .................. 235/385 |
| 5,680,586 | A | | 10/1997 | Elkins et al. ................... 703/27 |
| 5,732,214 | A | | 3/1998 | Subrahmanyam ........... 709/227 |
| 5,739,869 | A | | 4/1998 | Markle et al. ............... 348/589 |
| 5,774,537 | A | | 6/1998 | Kim ............................ 379/157 |
| 5,797,125 | A | | 8/1998 | Hirohama .................... 704/277 |
| 6,092,035 | A | | 7/2000 | Kurachi et al. ................. 704/3 |
| 6,169,498 | B1 | | 1/2001 | King et al. ............... 340/686.1 |
| 6,199,753 | B1 | | 3/2001 | Tracy et al. ................. 235/375 |
| 6,352,478 | B1 | | 3/2002 | Gabai et al. .................. 463/42 |
| 6,356,875 | B1 | | 3/2002 | Green et al. .................... 705/9 |
| 6,381,744 | B1 | | 4/2002 | Nanos et al. ................. 725/24 |
| 6,519,568 | B1 | * | 2/2003 | Harvey et al. ................. 705/1 |
| 6,677,852 | B1 | * | 1/2004 | Landt ........................ 340/10.1 |
| 6,754,190 | B1 | * | 6/2004 | Gurney et al. ............. 370/329 |
| 6,758,403 | B1 | * | 7/2004 | Keys et al. ............ 235/462.45 |
| 6,769,607 | B1 | * | 8/2004 | Pitroda et al. .............. 235/380 |

OTHER PUBLICATIONS

"Bluetooth:" searchNetworking.com Definitions, Keith Flint, Kim Karvinen, and David Tee, Feb. 14, 2002.
"Bluetooth Wireless/The Specification" Bluetooth, The Official Bluetooth Website, http://bluetooth.com/dev/specifications.asp, 2001.
Copy of the Notification of Transmittal of the International Search Report for patent application No. PCT/US03/30044, dated Sep. 23, 2003, (5 pages).

(Continued)

*Primary Examiner*—Van T. Trieu
(74) *Attorney, Agent, or Firm*—Shumaker & Sieffert, P.A.

(57) ABSTRACT

Embodiments of the invention include devices and methods for delivering information that is stored in one or more delivery formats in a memory to a user in a format appropriate for the user. A user device stores an information delivery format indication. The information device detects the user device and receives the information delivery format indication from the user device. A plurality of files within a memory of the information device contain information, each file containing the information in a different delivery format. The information device uses the information delivery format indication to select a file containing the information in a format appropriate for a user of the user device, and delivers the information to the user using the selected file.

59 Claims, 6 Drawing Sheets

OTHER PUBLICATIONS

Copy of the Notification of Transmittal of International Preliminary Examination Report for patent application No. PCT/US03/30044, dated Feb. 7, 2005, (4 pages).

"What is Radio Frequency Identification (RFID)?" The Associate for Automatic Identification and Data Capture Technologies, The Aim Global Network, http://aimglobal.org/technologies/rfid/what_is_rfid.htm.

"Introduction to IrDA" Vladimir Myslik, HardWare Server, http://hw.cz/english/docs/irda/irda.html.

"Technical Summary of "IrDA DATA" and "IrDA Control"", Infrared Data Association, http://www.irda.org/standards/standards.asp.

"Common Applications" The Associate for Automatic Identification and Data Capture Technologies, The Aim Global Network, http://aimglobal.org/technologies/rfid/common_applications_rfid.asp.

"Radio Frequency Identification—RFID A Basic Primer" The Associate for Automatic Identification and Data Capture Technologies, The Aim Global Network, http://aimglobal.org/technologies/rfid/resources/papers/rfid_basics_primer.htm.

"Bluetooth Specification" Version 1.1, Bluetooth, May 8, 2001, pp. 55-120.

\* cited by examiner

DELIVERY OF EMBEDDED INFORMATION IN A SELECTED FORMAT

TECHNICAL FIELD

The invention relates to the provision of information and, more particularly, to the delivery of information that is stored in one or more delivery formats in a memory to a user in a format appropriate for the user.

BACKGROUND

People often encounter situations where they need or want to receive information from a source other than another person, but are unable to receive the information because of a language barrier. In an airport or train station, for example, a person may need information that will direct him to a particular location or will tell him arrival and departure times, but the person may be unable to obtain the information because he does not understand the local language. At a shopping mall or an amusement park, the person may desire information about operating hours, or a prospective purchase or an attraction, but may encounter a language barrier. A person may also experience a language barrier when encountering instructions for the operation of a device such as a vending machine, automatic teller machine, microwave oven, or amusement device.

Information may be delivered to a person in a variety of ways, or "delivery formats." For example, information may be delivered to the user via a display as text and/or symbol, via a speaker as an audible message, or via a display as a video clip with or without an audible message. Further, the delivery format may include written or audible information in a language with which the person may be unfamiliar. A person traveling in foreign country and entering a subway station, for example, may be bombarded with information, but may not be able to understand or receive the information. The shortcomings of delivery formats are not limited to foreign travel, however. A deaf person in his own land may be unable to understand information presented in an audible delivery format, a blind person may not be able to understand information presented in a symbolic delivery format, and an illiterate person may not be able to understand information presented in a textual delivery format.

SUMMARY

In general, the invention provides techniques for delivering information to a "user," i.e., a person desiring to understand the information, in a delivery format such that the user can understand the information. The information may be delivered by any of a number of devices, collectively referred to herein as "information devices." In particular, the invention provides techniques for selecting a file or files containing the information from among a plurality of files within a memory of an information device. Each file contains the information in a different delivery format. A "user device" in the possession of the user stores an information delivery format indication. The information device detects the user device and receives the information delivery format indication from the user device. The information device uses the information delivery format indication to select a file containing the information in a delivery format appropriate for a user, and delivers the information in the appropriate delivery format to the user using the selected file.

In one embodiment, the invention is directed to a method comprising wirelessly detecting a user device, wirelessly receiving an information delivery format indication from the user device, selecting a file that contains information from a plurality of files stored in a memory that contain the information in a plurality of information delivery formats based on the indication, and delivering the information to a user of the user device using the information delivery format associated with the selected file.

In another embodiment, the invention is directed to a device that includes a memory to store information in a plurality of files, wherein each of the plurality of files contains the information in a different information delivery format. The device further includes an input/output circuit and a processor that wirelessly detects a user device and wirelessly receives an information delivery format indication from the user device via the input/output circuit. The processor further selects a file from the plurality of files stored in the memory based on the indication, and delivers the information to a user of the user device using the information delivery format associated with the selected file.

In another embodiment, the invention is directed to a method comprising establishing a communication session with an information device via a local wireless communication channel, sending a message to the information device that indicates an information delivery format, receiving a file containing information in the indicated format from the information device, and delivering the information to a user in the indicated format.

In another embodiment, the invention is directed to a method comprising receiving an information delivery format indication from a portable user device via a data cable, selecting a file that contains information from a plurality of files stored in a memory that contain the information in a plurality of formats based on the indication, and delivering the selected file to the user device via the data cable for delivery of the information to the user. Each of the plurality of files contains the information in a different information delivery format.

In another embodiment, the invention is directed to a device that includes a memory to store information in a plurality of files, wherein each of the plurality of files contains the information in a different information delivery format. The device further includes a data port to receive a data cable and a processor. The processor receives an information delivery format indication from a portable user device via the data cable, selects a file from the plurality of files stored in the memory based on the indication, and delivers the selected file to the user device via the data cable for delivery of the information to the user.

In another embodiment, the invention provides a method comprising establishing a communication session with an information device via a data cable and a portable user device, sending a message to the information device that indicates an information delivery format, receiving a file containing information in the indicated format from the information device, and delivering the information to a user in the indicated format.

The invention may offer one or more advantages. An information device of the present invention may store information in a wide variety of delivery formats, thus allowing the information device to serve a variety of users with varying delivery format requirements. An information device of the present invention may provide a space-saving advantage to the extent that it is not necessary to display the same information at the same time in different languages. The information device may be located virtually anywhere, and may be incorporated within or collocated with virtually any device. All of the files needed by the information device may be contained within the information device. User devices are generally portable, and in some embodiments may be worn or carried by the user. User devices may be small, and may be easily incorporated in clothing or other devices the user owns. Further, user devices may be inexpensive, or may involve the installation of application software on a user device already owned by the user.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
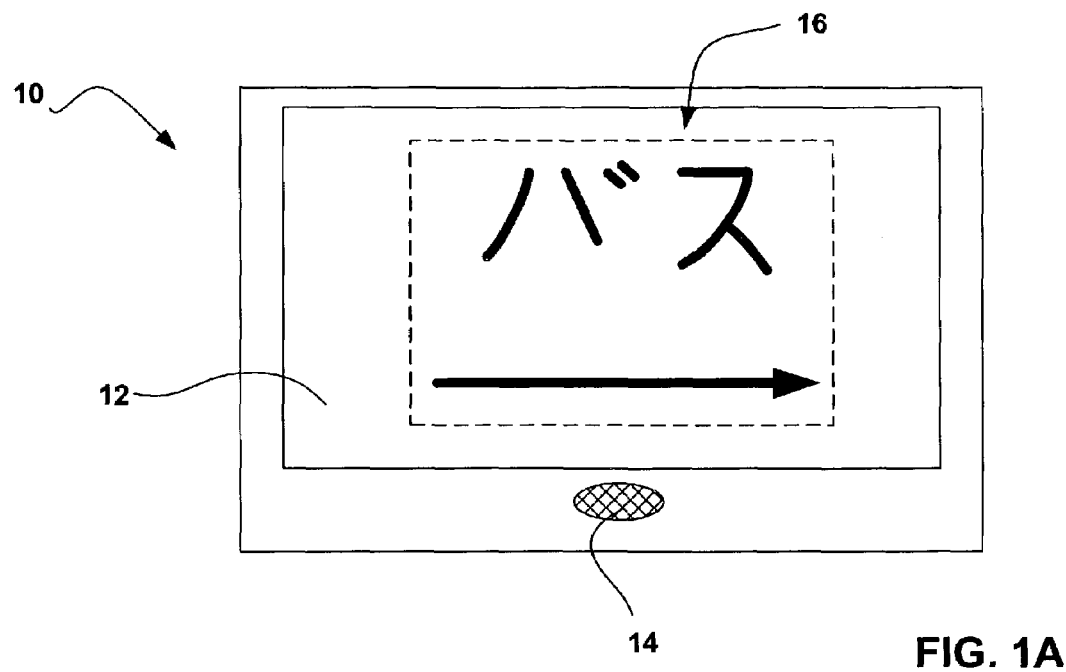
FIG. 1A is a drawing illustrating an exemplary information device in the form of an electronic message board.

FIG. 1A is a drawing illustrating an exemplary information device in the form of an electronic message board 10. In this embodiment, message board 10 includes a display 12, such as a light-emitting diode (LED) display, liquid crystal display (LCD), a cathode ray tube (CRT) display, or the like, for delivering information to users visually. Message board 10 of this embodiment also includes a speaker 14 for delivering information to users audibly. Message board 10 is shown in FIG. 1A as displaying information to users visually as Japanese text and symbol 16. Message board 10 may be found in any of several venues, such as an airport. Japanese text and symbol 16 includes Japanese katakana and an arrow pointing to the right. The Japanese text is "basu," which is equivalent to the English word "bus." Thus, the information delivered in the display format shown in FIG. 1A is that a bus may be found if the user heads to the right. The format in which the information is delivered to the user could be described as text in Japanese, with a symbol.

Message board 10 of this embodiment may be installed in Japan, and accordingly Japanese text and symbol 16 may be the default information delivery format used by message board 10 to deliver the information to users. In Japan, this would be an appropriate default information delivery format because the majority of the users would read and understand Japanese text and would thus understand the information conveyed by Japanese text and symbol 16.

A file containing Japanese text and symbol 16 may be stored within message board 10. Message board 10 may use the file to deliver text and symbol 16 to users via display 12. Message board 10 may also store one or more additional files containing the information, e.g., that a bus may be found if the user heads to the right, in one or more additional delivery formats. These additional files may include: text display files, which may include equivalents of text and symbol 16 in a variety of languages; symbolic files, which may include symbols representing a bus and the arrow; audio files, which may include messages in a variety of languages indicating that a bus may be found if the user heads to the right; or video files, which may, for example, show a person walking to and/or boarding a bus. In addition to text display files and audio files that include the information in a variety of languages, message board 10 may store text display files and audio files that include the information at a variety of different comprehension levels, such as text display files and audio files that present the information via messages suitable for children. Message board 10 may also use these additional files and deliver their contents to users via display 12 and/or speaker 14. Message board 10 may select one of these files for use in delivering the information to a particular user based on data received from a user device that indicates an appropriate information delivery format for the user of that device, as will be described below.

Figure 1B:
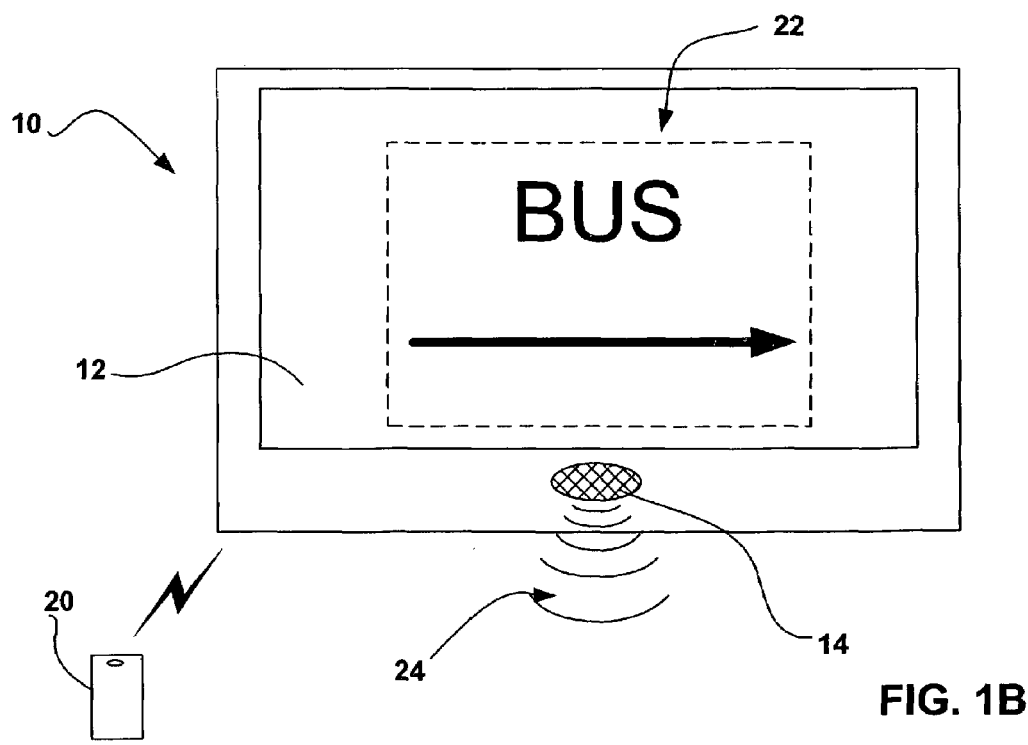
FIG. 1B is a drawing illustrating an exemplary application of the present invention in which the electronic message board of FIG. 1A interacts with an exemplary user device in the form of an RFID tag.

FIG. 1B is a drawing illustrating an exemplary application of the present invention in which message board 10 of FIG. 1A interacts with an exemplary user device in the form of an RFID tag 20. RFID tag 20 may be worn or carried by a user. For this exemplary application, message board 10 may include an RFID tag reader (not shown) that detects and reads RFID tag 20.

RFID tag 20 is a wireless electronic device that communicates with the RFID tag reader. RFID tag 20 may include an integrated circuit (not shown) and a coil (not shown). The coil may act as a source of power, as a receiving antenna, and a transmitting antenna. The integrated circuit may include wireless communications components and memory. The RFID tag reader of message board 10 may include an antenna and a transceiver.

The RFID tag reader of message board 10 may "interrogate" RFID tag 20 by directing an electromagnetic (i.e., radio) signal to RFID tag 20. In order to reduce the size and weight of RFID tag 20, RFID tag 20 may not contain an independent power source, but may instead receive power from the interrogating signal. Upon power-on, RFID tag 20 may perform certain operations, which may include transmitting data stored in the memory of the RFID tag 20 to the RFID tag reader. The transmitted data may include an information delivery format indication and other data. Examples of transmitted data will be described below.

In some applications of the invention, protocol negotiation and establishment of a communication session between message board 10 and RFID tag 20 is unnecessary. Further, upon detection of RFID tag 20, message board 10 may recognize RFID tag 20 from a previous encounter or from a pre-registration. In general, pre-registration of RFID tag 20 with message board 10 provides message board 10 with information about RFID tag 20 prior to detection. Pre-registration of RFID tag 20 with message board 10, however, is not necessary to the invention. The invention encompasses applications in which message board detects RFID tag 20, and prior to detection RFID tag 20 was unknown to message board 10.

The RFID tag reader of message board 10 may generate an interrogation signal that may be received by RFID tags 20 within a "read area." The read area is the area in which the strength of the received electromagnetic signal is sufficient to power the tag 20, and will depend on the strength of the signal generated by the RFID tag reader. RFID does not depend on a "line of sight" between a tag 20 and the reader. Thus, the reader may interrogate any tag 20 within the read area.

The read area may have a radius as large as several meters, although for the purposes of the present invention a read area with a radius of one meter would be sufficient. It may be desirable for purposes of the present invention to size the read area of the RFID tag reader of message board 10 such that an RFID tag 20 worn or carried by a user is interrogated when the user is in position to receive information from message board 10. The RFID tag reader of message board 10 may be configured to generate the interrogation signal in a generally continuous manner such that any RFID tag 20 that enters its read area will be interrogated.

RFID tag 20 may store data indicating one or more desired information delivery formats for a user of RFID tag 20 in the memory within its integrated circuit. This data may be referred to as an "information delivery format indication." The information delivery format indication may indicate, for example, one or more characteristics of the user, such as the name of the user or other user identification, languages understood, visual acuity, deafness or hearing impairments, illiteracy, or age. The information delivery format indication may indicate these characteristics of the user by indicating aspects of an information delivery format that would be required by or helpful to such a user, such as text, symbol, audio, video, a particular language, a particular comprehension level, a particular text size, or a particular volume level. Delivery of the file with increased text size or at an increased volume may be indicated, for example, when the user of RFID tag 20 is elderly. The information delivery format indication may be stored in RFID tag 20 when RFID tag 20 is assigned to a user.

RFID tag 20 is shown in FIG. 1B as having entered the read area of the RFID tag reader of message board 10. Upon entering the read area, RFID tag 20 may receive the interrogation signal generated by the RFID tag reader. Upon receiving the interrogation signal, RFID tag 20 may power-on and transmit the information delivery format indication contained in the memory within its integrated circuit to the RFID tag reader. The RFID tag reader may deliver the received information delivery format indication to message board 10. By receiving the information delivery format indication via the RFID tag reader, message board 10 both detects RFID tag 20 and receives the information delivery format indication from RFID tag 20.

Message board 10 may select a file to use in delivering the information to the user based on the received information delivery format indication. In the example shown in FIG. 1B, RFID tag 20 stores an information delivery format indication that indicates that the user wearing or carrying RFID tag 20 understands written and spoken English. Thus, message board 10 may, as shown in FIG. 1B select a file containing English text and symbol 22 and deliver English text and symbol 22 via display 12, or select an audio file containing English message 24 and deliver English message 24 via speaker 14. In some embodiments, message board 10 may also select a text size for English text and symbol 22 or a volume level for English message 24 based on the received information delivery format indication, and display English text and symbol 22 according to the select text size or deliver English message 24 at the selected volume.

Figure 2A:
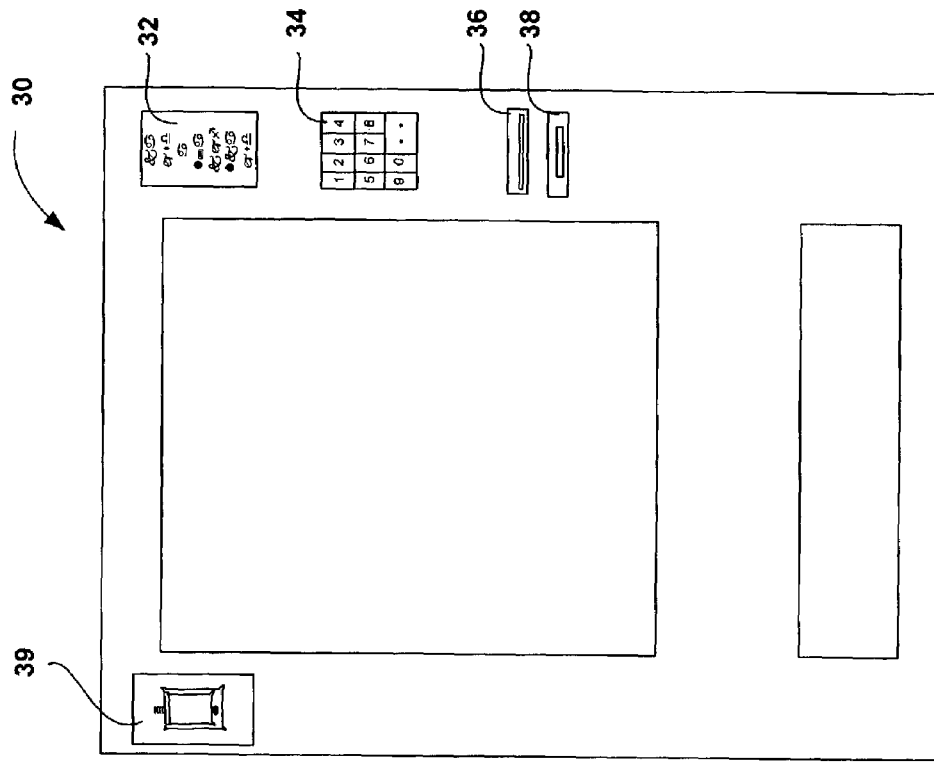
FIG. 2A is a perspective drawing illustrating another exemplary application of the present invention, including another exemplary information device in the form of a vending machine interacting with another exemplary user device in the form of a personal digital assistant (PDA).
Figure 2A:
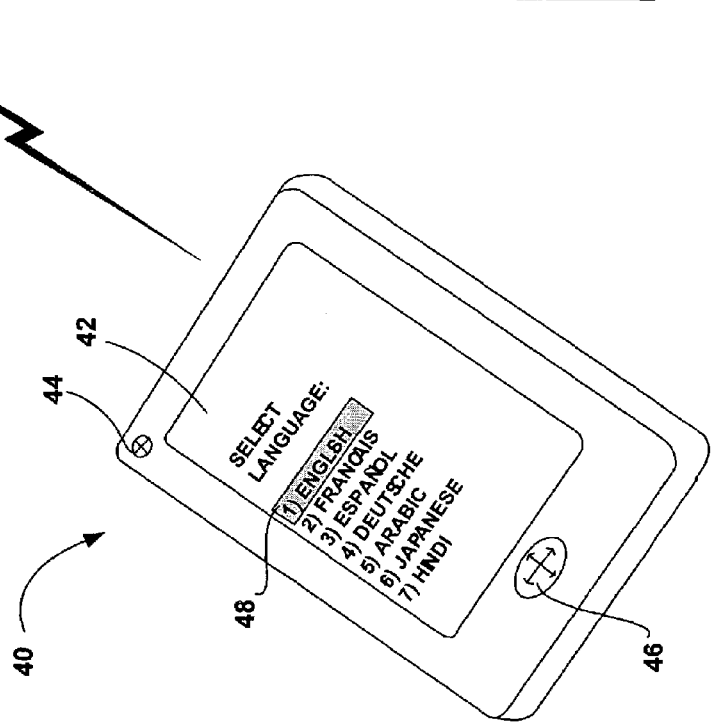
Figure 2B:
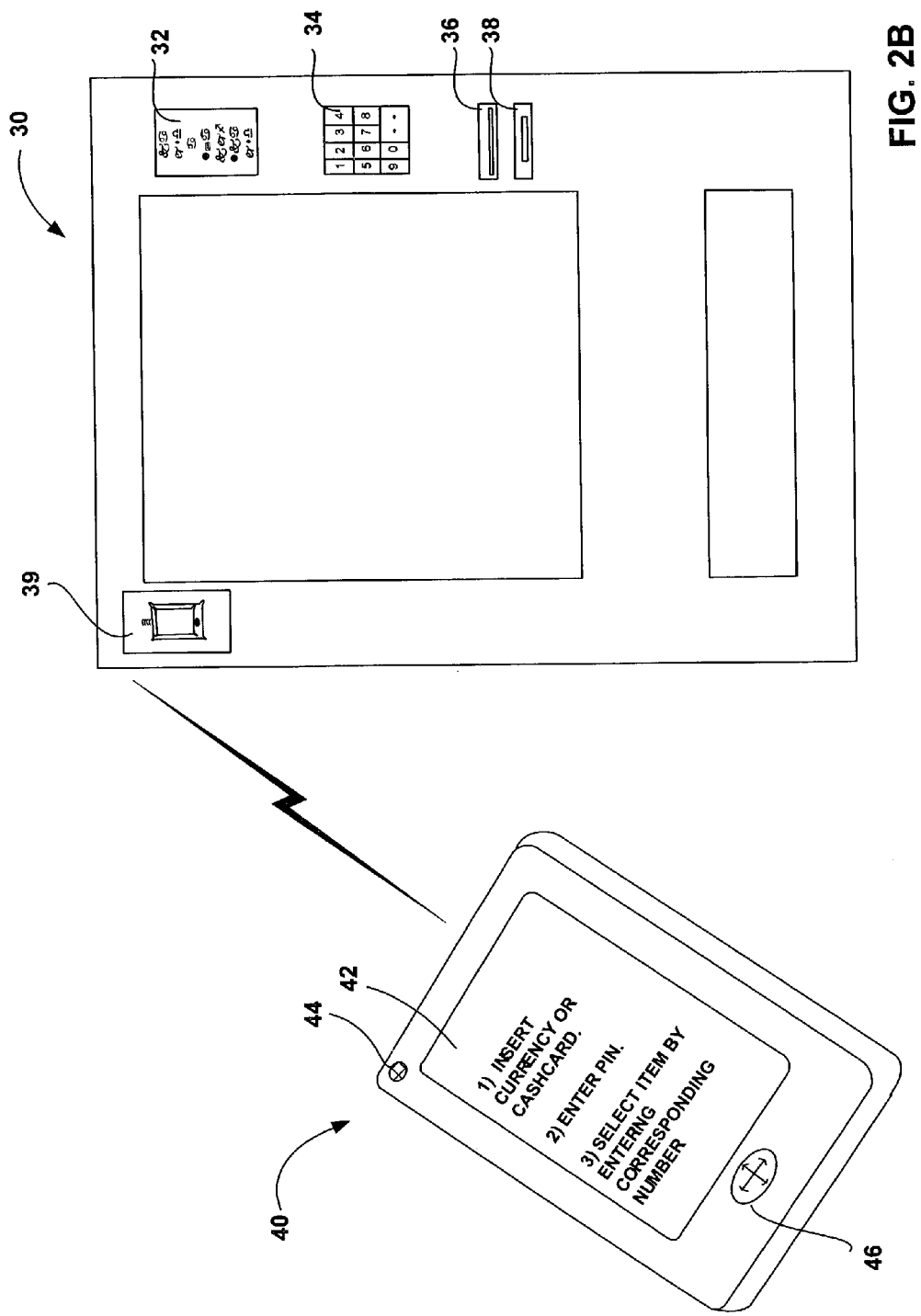
FIG. 2B is a perspective drawing further illustrating the exemplary application of the present invention illustrated in FIG. 2A.

FIGS. 2A and 2B illustrate another exemplary application of the present invention, including another exemplary information device in the form of a vending machine 30 interacting with another exemplary user device in the form of a personal digital assistant (PDA) 40. In particular, FIGS. 2A and 2B illustrate an application of the present invention to the situation where the embodiment of an information device, in this case vending machine 30, does not include a display 12 or speaker 14. Instead, the information device delivers information to a user in a selected format via a user device, such as PDA 40. Of course, an information device may also deliver information to a user in a selected format via a user device, such as PDA 40, in situations where the information device includes a display 12 or speaker 14, such as electronic message board 10 shown in FIGS. 1A and 1B.

Vending machine 30 shown in FIGS. 2A and 2B includes printed text instructions 32 in some unspecified language for the use of vending machine 30 to purchase items stored therein, a numeric keypad 34 for selecting an item for purchase, and slots 36, 38 to receive a card, such as a credit or debit card, or currency. The configuration of vending machine 30 shown in FIG. 2A with respect to its vending machine functions is merely exemplary.

PDA 40 as shown in FIGS. 2A and 2B includes a display 42, speaker 44, and a pointing device 46 to control the movement of a pointer 48 within display 42 to select items displayed on display 42. PDA might also include a stylus (not shown), or display 42 may be configured as a touch-screen for selecting items displayed on display 42. The configuration of PDA 40 shown in FIG. 2A is merely exemplary.

Vending machine 30 is shown in FIGS. 2A and 2B as being in wireless communication with PDA 40. Vending machine 30 and PDA 40 may communicate via a local wireless communication channel. The local wireless communication channel may, for example, be a radio frequency communication channel or an infrared communication channel. Communication between vending machine 30 and PDA 40 via a local radio frequency communication channel may be done in accordance with the Bluetooth Specification set, which was promulgated by the Bluetooth Special Interest Group (SIG), and is available for download at http://www.bluetooth.com. Alternatively, communication via a local radio frequency communication standard may be done in accordance with the 802.11 Specification set promulgated by Institute of Electrical and Electronics Engineers (IEEE). Communication between vending machine 30 and PDA 40 via a local infrared communication channel may be done in accordance with the Infrared Data Association (IrDA) Specification set, promulgated by the IrDA, and available for download at http://www.irda.org. In order for vending machine 30 and PDA 40 to communicate using either a radio frequency communication channel or an infrared communication channel, both vending machine 30 and PDA 40 may include an appropriate transceiver and, in the case of radio frequency communication, an antenna.

Pre-registration of PDA 40 with vending machine 30 may be unnecessary. Rather, message board 10 may detect RFID tag 20, which was previously unknown to message board 10. The Bluetooth, 802.11 and IrDA Specification sets provide methods by which an information device, such as vending machine 30, may detect and establish communication with a previously unknown user device, such as PDA 40. According to these methods, vending machine 30 may repeatedly broadcast messages via the local wireless communication channel. In the Bluetooth Specification, these messages are referred to as inquiry messages. In the 802.11 specification, these messages are referred to as beacon frames. In the IrDA Specification, these messages are referred to as discovery request messages.

The function of inquiry messages, beacon frames and discovery request messages is essentially the same. Whenever an active user device enters the communication range of an inquiring, beaconing, or discovering information device, the user device will receive a message from the information device. The user device may respond to the message with a response message that contains its address and other information needed by the information device to establish a "communications session" with the user device. The information device initiates the process of establishing a communication session, which includes protocol-specific negotiations between the information and user devices. Once these negotiations are complete, the communication session has been established and data packets may be transferred between the devices.

In this manner, when a user enters the communication range of vending machine 30 with PDA 40, vending machine 30 may detect and establish a communication session with PDA 40. The communication range of vending machine 30 will vary depending on the type of local wireless communication channel employed, and the strength of the signals generated by the transceivers within vending machine 30 and PDA 40. Further, while radio frequency communication does not require a line of sight, infrared communication typically does.

It may be desirable to configure the communication range of vending machine 30 such that it does not establish a communication session with PDA 40 until the user is ready to receive information in a selected format from vending machine 30 via PDA 40. Moreover, it may be the case that the user will not have activated PDA 40 such that PDA 40 can it receive information in a selected format from vending machine 30 before the user approaches vending machine 30. Thus it may be desirable to provide printed symbolic instructions 39 located on or near vending machine 30 to make the user aware that information is available from vending machine 30 via PDA 40 in multiple formats, and to instruct the user to activate PDA 40 to receive information in a selected format. Symbolic instructions 39 could include one or more universal symbols that announce the alternative information delivery capabilities, such as the depiction of a wirelessly communicating PDA shown in FIGS. 2A and 2B.

Activating PDA 40 such that PDA 40 can receive information in a selected format from vending machine 30 may involve turning on PDA 40 and running a software package stored in a memory within PDA 40. The software package may allow communication with vending machine 30 via a local wireless communication channel as described above. The software package may further facilitate interaction between the user of PDA 40 and vending machine 30 for the selection of a delivery format, the receipt of information from vending machine 30, and the delivery of received information to the user as will be described below.

Use of PDA 40 by a user to receive information in a selected format may be described as follows. The user may approach vending machine 30 intending to purchase an item therein. The information provided by vending machine 30 may include instructions for use as a vending machine. The user may be unable to understand printed instructions 32 as they are provided in format that is not comprehended by the user, such as a language that is foreign to the user. However, vending machine 30 of this embodiment may store files containing the instructions in a variety of formats, including text, audio, symbolic, and video files in a variety of languages and at a variety of comprehension levels.

The user may have previously activated PDA 40, or the user may activate PDA 40 upon realizing that instructions in the users preferred format might be available from vending machine 30. The user may realize that the instructions might be available in the users preferred format upon viewing printed symbolic instructions 39. A communication session between vending machine 30 and PDA 40 may be established via a local wireless communications channel when PDA 40 is activated as described above.

Vending machine 30 may select a file containing the instructions in a delivery format appropriate for the user from among a plurality of files that contain the instructions in a plurality of delivery formats, and deliver the selected file to PDA 40. This may be accomplished in a number of ways. For example, PDA 40 may store an information delivery format indication that indicates one or more desired information delivery formats for a user of PDA 40 in a memory, and send a message containing the information delivery format indication to vending machine 30 without user intervention when the communication session is established. The information delivery format indication may be used by vending machine 30 to select a file as will be described below. In some embodiments, vending machine 30 may determine the available information delivery formats, and send a message to PDA 40 containing one or more lists of the available information delivery formats. PDA 40 may, as shown in FIG. 2A, present these lists to the user via display 40 so that the user can select an information delivery format using pointer device 44 and pointer 46. PDA 40 may then return the selection made by the user to vending machine 30 as an information delivery format indication contained in a message.

In some embodiments, vending machine 30 may determine the available information delivery formats, and send a message to PDA 40 containing one or more lists of the available information delivery formats after receiving an initial information delivery format indication from PDA 40 and determining that the format indicated is not available.

Vending machine 30 may then deliver the selected file, which contains the instructions in the selected format, to PDA 40 via the local wireless communication channel. If the file is a text and/or symbolic file, PDA 40 may deliver the instructions contained therein to the user via display 40 as shown in FIG. 2B. If the file is an audio file, PDA 40 may deliver the instructions contained therein via speaker 42. If the file is a video file, PDA 40 may present the video to the user via display 40 and speaker 42.

Although communication between vending machine 30 and PDA 40 has been described as occurring via a local wireless communication channel, in some embodiments of the present invention vending machine 30 may communicate with PDA 40 via a cable (not shown) connecting a data port (not shown) of vending machine 30 with a data port (not shown) of PDA 40. Vending machine 30 and PDA 40 may communicate via this interface in accordance with the EIA232 serial data communication standard promulgated by the Electronics Industry Association.

In such embodiments, vending machine 30 may detect PDA 40 when the adapter of the cable is inserted into the data port of vending machine 30. Vending machine 30 may then receive an information delivery format indication from PDA 40 via the interface and select a file containing information in an appropriate delivery format as described above. Vending machine 30 may deliver the file to PDA 40 via the interface.

Figure 3:
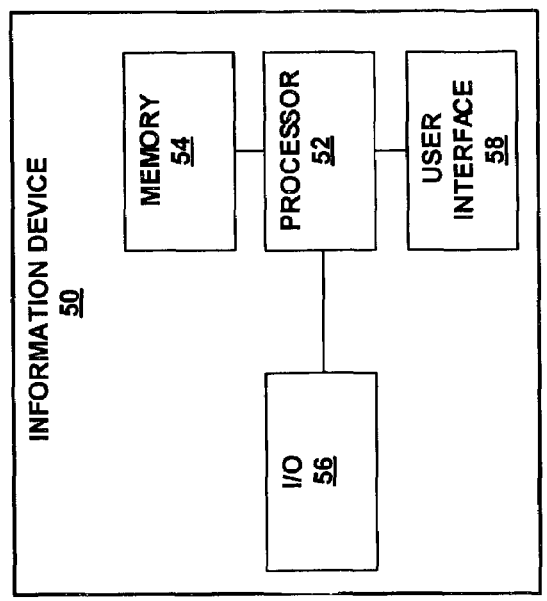
FIG. 3 is a block diagram illustrating an exemplary information device and an exemplary user device.
Figure 3:
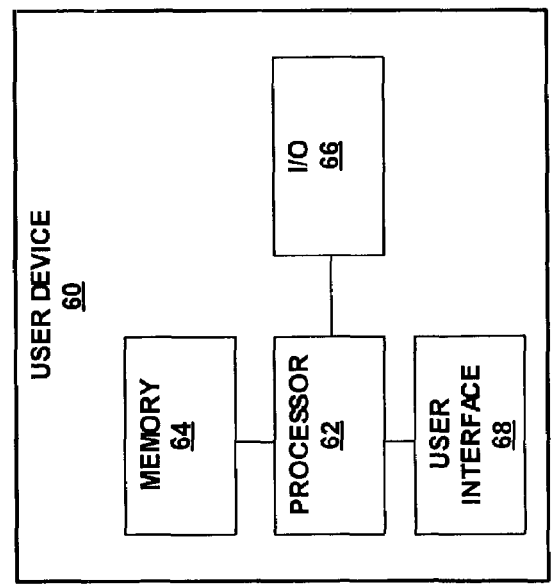

FIG. 3 is a block diagram illustrating an exemplary information device 50 and an exemplary user device 60. Information device 50 may be electronic message board 10 of FIGS. 1A and 1B. Information device 50 may also be vending machine 30 of FIGS. 2A and 2B. User device 60 may be RFID tag 20 of FIGS. 1A and 1B, or PDA 40 of FIGS. 2A and 2B. Information device 50 and user device 60 are not limited to the exemplary embodiments of FIGS. 1A, 1B, 2A and 2B, however. FIG. 3 more generally illustrates components that may be included in any information device 50 or user device 60.

As shown in FIG. 3, information device 50 may include a processor 52 and a memory 54. Processor 52 may, for example, be implemented as microprocessor, ASIC, FPGA, discrete logic circuitry, or the like. Memory 54 may store information in one or more files, and each file may contain the information in a different delivery format. Processor 52 may execute code stored in memory 54 to cause processor 52 to carry out the functions ascribed information devices, such as message board 10 and vending machine 30, in this description. These functions may include detecting a user device 60, selecting a file stored in memory 54 based on a received information delivery format indication, and delivering information to a user. Memory 54 may include a ROM, RAM, CD-ROM, EEPROM, or the like, and may include a variety of media such as hard disk, optical disk, magnetic tape, removable magnetic disk, or the like. Memory 54 may be a local memory e.g., memory 54 may be proximate to processor 52, or need not be accessed via a network.

Information device 50 may further include an input/output circuit (I/O) 56. Processor 52 may detect user device 50 and receive an information delivery format indication, as described above, via I/O 56. Information device 10 may also include a user interface 58 for delivering information to a user. User interface 58 may, for example, include a display 12 or speaker 14.

User devices 60 may take many forms. As shown in FIG. 3, user device 50 may, in some embodiments, include a processor 62 and a memory 64. Processor 62 may, for example, be implemented as microprocessor, ASIC, FPGA, discrete logic circuitry, or the like. Memory 64 may store an information delivery format indication. Processor 62 may execute code stored in memory 64. Memory 64 may include a ROM, RAM, CD-ROM, EEPROM, or the like, and may include a variety of media such as hard disk, optical disk, magnetic tape, removable magnetic disk, and the like.

In some embodiments, user device 60 may also include an I/O 66 for communicating with information device 50. In some embodiments, user device 60 may deliver an information delivery format indication to information device 50 via I/O 66. In some embodiments, user device 60 may receive information from information device 50 to be delivered to a user via I/O 66. In these embodiments user device 60 may also include a user interface 68 for receiving input from a user and for delivering information received from information device 50 to the user. User device 60 may be portable.

In general, memory 54 of information device 50 may store a plurality of files containing information, such as the directions of FIGS. 1A and 1B or the use instructions of FIGS. 2A and 2B, in a plurality of delivery formats. A file may comprise any entity of data representing the information that is available to processor 52, and thus may be of any file type for use with any application program. These files may include: text display files in a variety of languages; symbolic files, which may include symbols representing the information; audio files, which may include messages in a variety of languages; or video files. Processor 52 may select one or more files from the plurality of files stored in memory 54 based on an information delivery format indication received from user device 60 via I/O 56, and deliver the information to the user of user device 60 using the information delivery format associated with the selected file.

The files may be stored in memory 54 as a database of such files. Each file may, in addition to the information that can be delivered to users, contain a number of format fields. Each format field may describe some aspect of the format in which the information stored in that file will be delivered to a user. For example, a format field may indicate whether the file contains text, symbol, audio, or video. Another format field may indicate a language of the text or audio. Another format field may indicate the comprehension level of the message that the file contains. Processor 52 may select a file to use in delivering the information to the user by comparing the received information delivery format indication with the format fields of files stored in memory 54. If a file having the appropriate format fields as indicated by the information delivery format indication is stored in memory 54, processor 52 may retrieve that file from memory 54 and deliver the information to the user of user device 60 using the information delivery format associated with the selected file. Processor 52 may also use the information delivery format indication to control aspects of the delivery of the selected file, such as the text size for displaying a text file and the volume for delivering an audio file.

User device 60 may, for example, comprise an RFID tag 20 as described above. In such an embodiment of user device 60, processor 62 may comprise an RFID tag integrated circuit and memory 64 the memory within the RFID tag integrated circuit described above. In such an embodiment of user device 60, I/O 66 may comprise the RFID tag coil acting as an antenna and the RFID integrated circuit acting as a transceiver as described above. In order for information device 50 to interact with such an embodiment of user device 60, I/O 56 of information device 50 may include the RFID tag reader as described above. An RFID tag embodiment of user device 60 might not include a user interface 68. Processor 52 of information device 50 may detect RFID tag 20 and receive an information delivery format indication from RFID tag 20 via an RFID tag reader included as a part of I/O 56. The RFID tag reader may interrogate RFID tag 20, receive a response from RFID tag 20, and deliver the response to processor 52. Processor 52 may extract the information delivery format indication from the response.

In other embodiments, user device 60 may comprise a barcode or magnetic card that may be worn or carried by a user. Such an embodiment of user device 60 might not include a processor 62, memory 64, I/O 66 or user interface 68. Instead data representing an information delivery format indication may be stored within the barcode or within the magnetic element of the magnetic card. In order for information device 50 to interact with these embodiments of user device 60, I/O 56 of information device 50 may include a barcode reader or a magnetic card reader. Such an embodiment of information device 50 may detect the user device 60 and receive an information format delivery indication when the user presents the barcode to the barcode reader or the magnetic card to the magnetic card reader such that the barcode reader can read the data stored as a barcode via the reflection of light or the magnetic card reader can read the data stored in the magnetic card via inductive coupling between the magnetic element within the magnetic card and the magnetic card reader.

Processor 52 of information device 50 may then extract the information delivery format indication from the data.

In other embodiments, user device 60 may comprise a PDA 40. In such embodiments, I/Os 56, 64 may include transceivers for communicating via a radio frequency communication channel or infrared communication channel, and, in the case of radio frequency communication, antennas. Alternatively, in such embodiments, I/Os 56, 64 may comprise serial data ports for making a wired connection with a serial data cable. In such embodiments, user interface 66 may include a display 40, speaker 42, pointer device 44, pointer 46, or stylus. Display 40 may be a touch-screen display.

As described above, a PDA 40 embodiment of user device 60 may indicate an information delivery format to a processor 52 of an information device 50 in a number of ways. For example, PDA 40 may store an information delivery format indication in memory 64, and send a message containing said information delivery format indication to information device 50 via a wireless communication channel without user intervention when a communication session is established. The information delivery format indication may be used by information device 50 to select a file stored within memory 54 as described above. In some embodiments, information device 50 may scan the format fields of files stored in memory 54 to determine the available information delivery formats, and send a message to PDA 40 containing one or more lists of the available information delivery formats. PDA 40 may, as shown in FIG. 2A, present these lists to the user via display 40 so that the user can select an information delivery format using pointer device 44 and pointer 46. PDA 40 may then return the selection made by the user to information device 10 as an information delivery format indication contained in a message.

In some embodiments, information device 50 may scan the format fields of files stored in memory 54, determine the available information delivery formats, and send a message to PDA 40 containing one or more lists of the available information delivery formats after receiving an initial information delivery format indication from PDA 40 and determining that the format indicated is not available.

In still other embodiments, user device 50 may comprise a cellular telephone. Such an embodiment may be used similarly to the PDA embodiment to receive information from information device 10 via a radio frequency communication channel, infrared communication channel, or data cable, and deliver information to the user via a display or speaker. In such an embodiment, user interface 66 may additionally include a numeric keypad.

Figure 4:
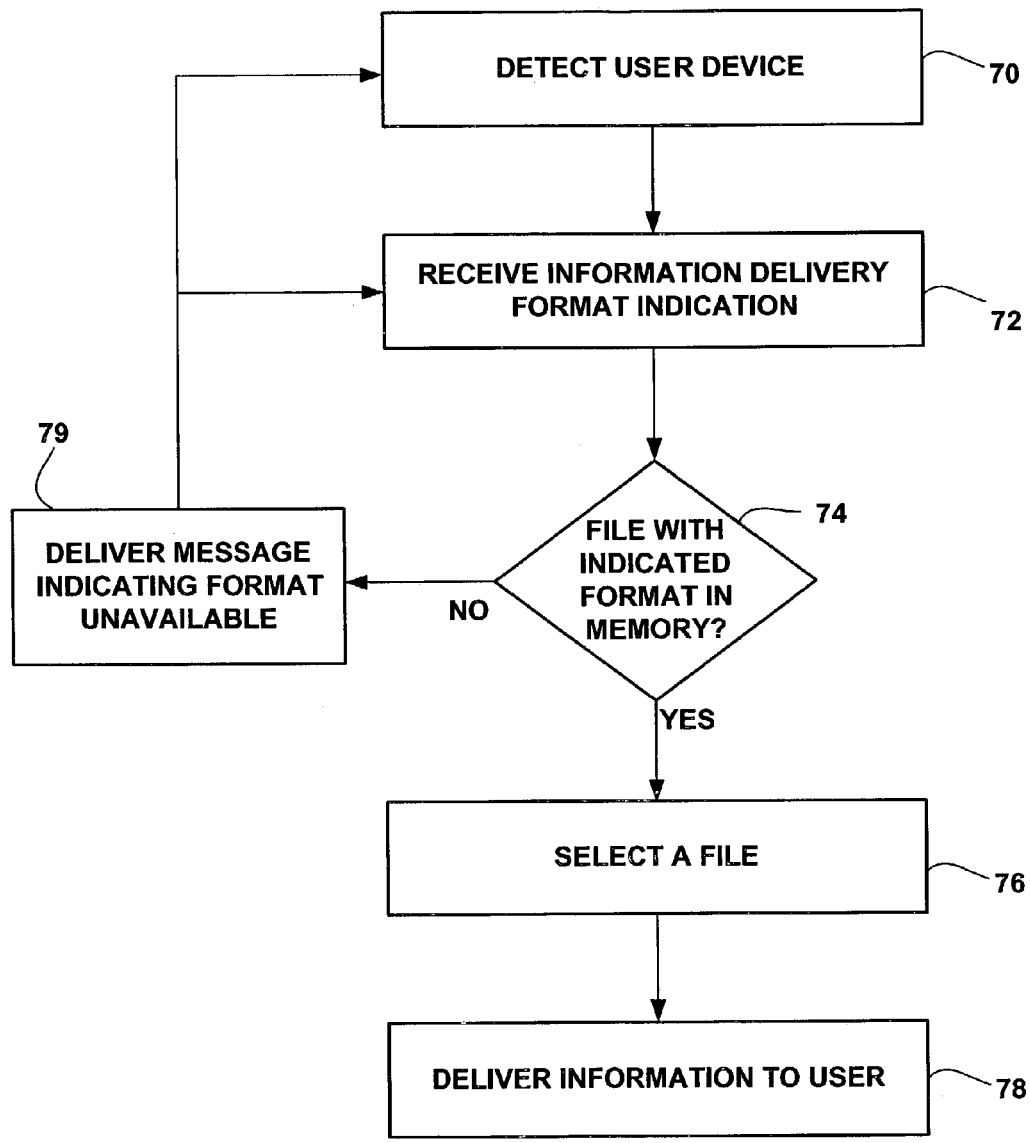
FIG. 4 is a flowchart illustrating an exemplary method according to the invention.

FIG. 4 is a flowchart illustrating an exemplary method according to the invention. Processor 52 of information device 50 detects user device 60 (70) and receives an information delivery format indication from user device 60 (72) by any of the methods described above. Memory 54 stores a plurality of files. Each of the plurality of files contains the information in a different information delivery format.

Processor 52 may identify an information delivery format based on the received information delivery format indication, determine whether any file of the plurality of files contains the information in the identified information delivery format (74), and select a file as a function of the determination (76). Processor 52 may compare the received information delivery format indication to format fields of the plurality of files, and select the file as a function of the comparison. In some embodiments, user device 60 may include a listing of multiple acceptable delivery formats. The listing may indicate preferences among the acceptable formats. When information device 50 does not support the primary information delivery format, processor 52 may determine whether information device 50 supports any of the secondary information delivery formats. Processor 52 may select a file that contains the information in the most preferred delivery format available.

Processor 52 delivers the information to a user of the user device using the selected file (78). Processor 52 may deliver the information to the user via user interface 58. Processor 52 may present the information to the user visually on an electronic display 12 and/or audibly via a speaker 14 and/or in any other fashion. Processor 52 may use the information delivery format indication to select a text size or volume as described above. Processor 52 may also deliver the selected file to user device 60 via I/O 56 for delivery to the user via display 42 or speaker 44.

If processor 52 does not find a file that supports the identified information delivery format indication, processor 52 may deliver a message to the user indicating that the indicated format is unavailable (79). This message may be delivered via user interface 58, or via I/O 56 and user device 60. After this message has been delivered, processor 52 may proceed to receive a new information delivery format indication from the same user device 60, or detect a new user device 60. Alternatively, when no file containing the information in the one or more delivery formats indicated by user device 60 are available, processor 52 may select a file containing the information in the delivery format that is closest to the one or more formats indicated by user device 60. Any technique may be used for determining which delivery format is closest to an indicated delivery format. When user device 60 indicates a symbolic delivery format, for example, processor 52 may select a format that incorporates symbols and words as the delivery format closest to a symbolic delivery format.

Figure 5:
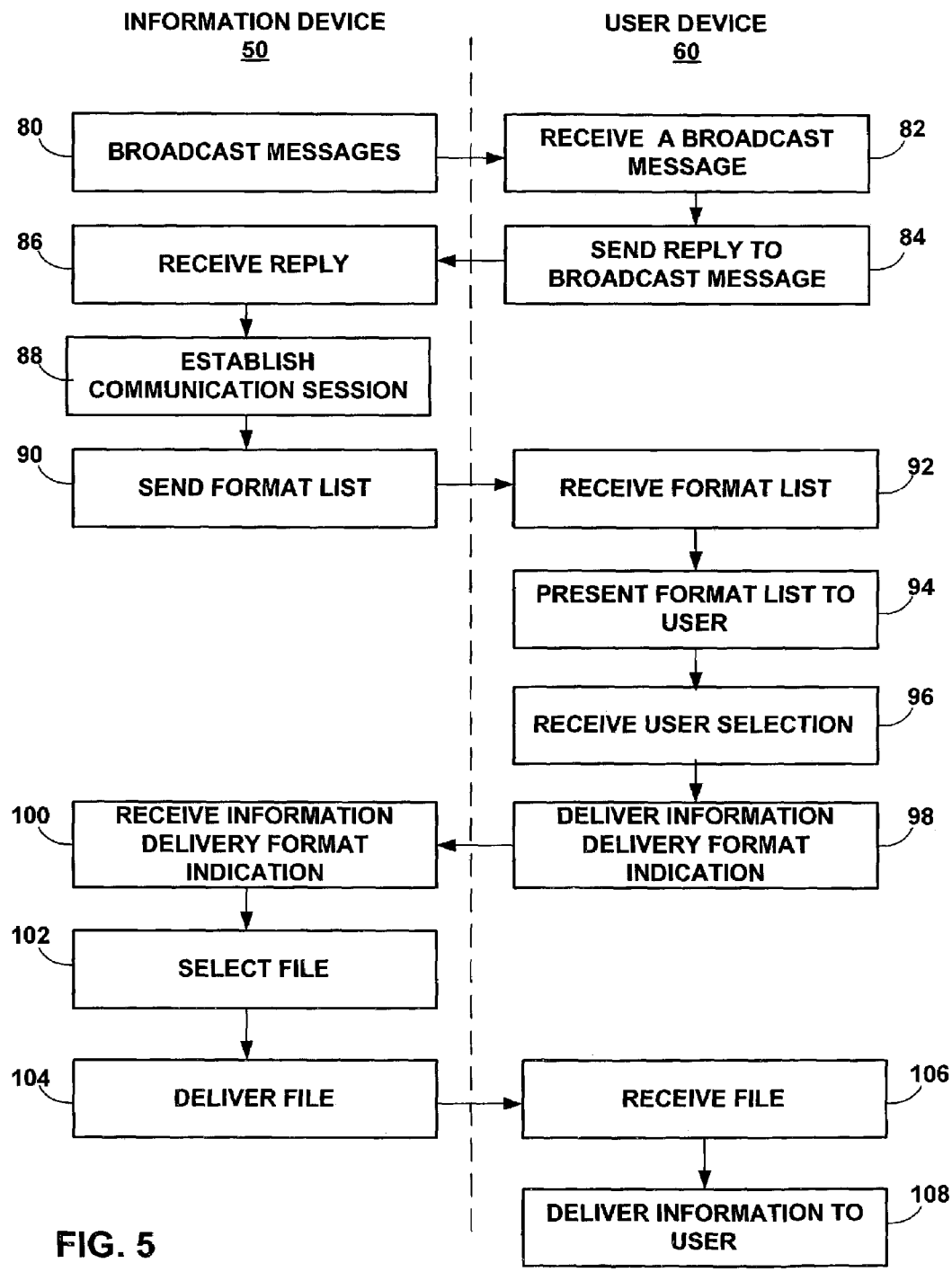
FIG. 5 is a flowchart illustrating another exemplary method according to the invention.

FIG. 5 is a flowchart illustrating another exemplary method according to the invention. Processor 52 of information device 50 may repeatedly broadcast messages via I/O 56 and a local wireless communication channel, as described above (80). When user device 60 is active and enters the communication range of information device 50, processor 62 of user device 60 may receive a broadcast message from information device 50 via I/O 66 (82). Processor 62 of user device 60 may respond to the broadcast message with a response message that contains its address and other information needed by processor 52 of information device 50 to establish a communications session with user device 60 via the local wireless communication channel (84). Processor 52 of information device 50 may receive this response (86), and use the information therein to establish a communication session (88).

Processor 52 of information device 50 may determine the available information delivery formats as described above, and send a message to user device 60 containing one or more lists of the available information delivery formats (90). When processor 62 of user device 60 receives the format lists (92), processor 62 may present these lists to the user via user interface 68 (94). Processor 62 may present these lists to the user via display 42 so that the user can select an information delivery format using pointer device 46 and pointer 48. When processor 62 of user device 60 receives the user selection (96), processor 62 may then return the selection made by the user to information device 50 as an information delivery format indication (98). Alternatively, processor 62 may deliver an information delivery format indication to information device 50 as soon as information device 50 establishes the communication session (88).

When processor 52 of information device 50 receives the information delivery format indication (100), processor 52 may select a file within memory 54 as described above (102), and deliver the selected file to user device 60 (104). When processor 62 of user device 60 receives the selected file (106), if may deliver the information therein to the user via user interface 68 (108).

The invention can provide one or more advantages. Information device 50 may store information in a wide variety of delivery formats, thus allowing information device 10 to serve a variety of users with varying delivery format requirements. Information device 50 may provide a space-saving advantage to the extent that it is not necessary to display the same information at the same time in different languages. Information device 50 does not require network access to retrieve files, thus the placement of information device 50 does not depend on the presence of a network connection. In other words, all of the files needed by information device 50 may be contained in information device 50. Moreover, virtually any device may be an information device 50. The invention is not limited to the exemplary embodiments described above, but may be adapted to devices in a variety of venues. Tollbooths, hospitals, information kiosks, fuel stations and restaurants, to name a few, may incorporate an information device 50.

User devices 60 likewise are not limited to the exemplary embodiments described above. User devices 60 are typically portable, and in some embodiments may be worn or carried by the user. User devices 60 may be small, and may be easily incorporated in clothing or other devices the user owns. Further, user devices 60 may be inexpensive, such as RFID tag 20, or may involve the installation of application software on a user device 60 already owned by the user, such as PDA 40.

Several embodiments of the invention have been described. Various modifications may be made without departing from the scope of the invention. For example, where information device 50 makes use of a user interface 58, information device 50 need not incorporate the user interface, but may instead connect to existing displays or speaker systems. As a further example, information device 50 need not be incorporated in or collocated within any device at all, but may instead communicate with user devices 60 in a designated area, such as a designated area of an airplane terminal or an amusement park.

As a further example, the information used by processor 52 of information device 50 to select files in order to provide information to a user of user device 60 need not be limited to the information delivery format indication received from user device 60. Additional information regarding the preferred delivery format for the user, as well as other information about the user that may be used by processor 52 to provide the user with messages targeted toward that user, may be stored in a user file for that user within a database. The database may be incorporated within memory 54 of information device 50, but will more likely be accessed by processor 52 via a computer network. In such embodiments, user device 60 may store a user identification, which may be received by information device 50 by any of the techniques described above in addition to the information delivery format indication, and used by processor 52 to access the user file within the database. Processor 52 may use both the information within the user file and the information delivery format indication received from user device 60 to select a file to deliver to the user.

For example, the user file may indicate that a preferred delivery format for the user is one in which a personalized message is used, and may contain the name of the user. Processor 52 may use this preferred delivery format indication from the user file, and any other information delivery format information received from user device 60 as described above, to select a file within memory 54 that contains a message in the preferred delivery format for the user and that allows the inclusion of a greeting or other personalized information. Processor 52 may, for example, retrieve the name of the user stored in the user file, include the name within the message contained in the selected file, and deliver the message including the name to the user using the selected file by any of the techniques described above. Thus, for example, a message board 10 as described above, may provide information to a user by name, letting the user know that the information is intended for the user.

The user file may also indicate preferred content for the user. For example, the user file may indicate dietary preferences of the user, hobbies of the user, or the like, and a processor 52 of an information device 50 may select a file from a memory 54 using the preferred content information within the user file in addition to the information delivery format indication received from user device 60 as described above. Thus, for example, if a user is a vegetarian, an information device 50 within a restaurant may select a file from a memory 54 that contains information regarding vegetarian dishes served by the restaurant in the indicated deliver format, and to use the selected file to deliver the information to the user by any of the techniques described above. Similarly, if a user is a golfer, an information device 50 within a sporting goods store may select a file from a memory 54 that contains information that directs the user to golf equipment within the store in the indicated deliver format, and to use the selected file to deliver the information to the user by any of the techniques described above.

In some embodiments, a plurality of information devices 50 may use a user file to maintain information indicating where a user has been, and to provide messages to the user that reflect this information. For example, a plurality of information devices 50 within a museum may maintain information in the user file that indicates which exhibits the user has visited. When the user visits a first exhibit, an information device 50 associated with the first exhibit may modify the user file to indicate that the user has visited the first exhibit. Other information devices 50 within the museum may use this information and the information delivery format indication received from user device 60 as described above to select a file that contains a message that reflects this information and is in the preferred delivery format.

Further, although processor 52 of information device 50 has been described herein as retrieving files stored in a single memory 54 that may be local in order to provide information to a user of a user device 60 in a preferred delivery format, embodiments of information device 50 may retrieve information to deliver to the user from multiple sources, some or all of which may be accessed via a computer network. For example, in one embodiment, an information device 50 that provides users with weather information stores a plurality of files for providing weather information in a plurality of delivery formats within a local memory 54. The files may, for example, include text, such as the words for temperature, humidity, wind, precipitation conditions, visibility conditions, and the like in a variety of languages. The processor 52 may receive a user identification from the user device 60, and access a user file associated with the user to retrieve a location associated with the user. The processor may access a remote weather information server and/or database via a network to retrieve up-to-date weather information for the location. The processor may further use an information delivery format indication received from a user device 60 and the weather information to select an appropriate template, incorporate the weather information into the selected template by, for example, incorporating numeric values for temperature, humidity, wind-speed, and the like, and deliver the formatted weather information to the user by any of the techniques described above. These and other embodiments are within the scope of the following claims.

The invention claimed is:

1. A method comprising:
wirelessly detecting a user device;
wirelessly receiving an indication of an information delivery format for a user of the user device from the user device;
selecting a file that contains information from a plurality of files stored in a memory, each of the files containing the information in a respective one of a plurality of information delivery formats, based on the information delivery format indicated for the user; and
delivering the information to the user of the user device using an information delivery format associated with the selected file.

2. The method of claim 1, wherein the memory is a local memory.

3. The method of claim 1, wherein the user device is portable.

4. The method of claim 1, wherein the user device includes at least one of a cellular telephone and a personal digital assistant (PDA).

5. The method of claim 1, wherein the user device includes a radio frequency identification (RFID) tag, and wherein wirelessly detecting the user device and wirelessly receiving the information delivery format indication comprises:
interrogating the RFID tag;
receiving a response to the interrogation from the RFID tag; and
extracting the information delivery format indication from the response.

6. The method of claim 1, wherein the user device includes at least one of a bar code and a magnetic tag, and wherein wirelessly detecting the user device and wirelessly receiving the information delivery format indication comprises:
reading data from the at least one of the bar code and the magnetic tag; and
extracting the information delivery format indication from the data.

7. The method of claim 1, wherein delivering the information to the user of the user device comprises communicating with the user device via a local wireless communication channel.

8. The method of claim 7, wherein the local wireless communication channel comprises at least one of a radio frequency communication channel and an infrared communication channel.

9. The method of claim 1, wherein detecting the user device comprises:
broadcasting messages via a local wireless communication channel; and
receiving a response from the user device via the local wireless communication channel.

10. The method of claim 1, wherein receiving the information delivery format indication comprises:
establishing a communication session with the user device via a local wireless communication channel;
receiving a message from the user device via the local wireless communication channel; and
extracting the information delivery format indication from the message.

11. The method of claim 1, wherein receiving the information delivery format indication comprises:
identifying available information delivery formats associated with the plurality of files;
sending a first message to the user device prompting the user to select one of the available information delivery formats; and
receiving a user selection of a delivery format from the user device.

12. The method of claim 1, wherein selecting the file comprises:
identifying an information delivery format based on the received information delivery format indication;
determining whether any file of the plurality of files contains the information in the identified information delivery format; and
selecting the file as a function of the determination.

13. The method of claim 12, wherein selecting the file further comprises:
determining that no file of the plurality of files contains the information in the identified information delivery format; and
sending a message indicating that the information is not available in the identified information delivery format to the user device.

14. The method of claim 12, wherein selecting the file further comprises:
determining that no file in the plurality of files contains the information in the identified information delivery format; and
selecting a file that contains the information in a delivery format closest to the identified information delivery format.

15. The method of claim 1, wherein selecting the file comprises:
comparing the received information delivery format indication to format fields of the plurality of files; and
selecting the file as a function of the comparison.

16. The method of claim 1, wherein receiving the information delivery format indication comprises receiving an information delivery format indication that includes a listing of multiple delivery formats and associated preferences, and selecting the file comprises selecting the file that contains the information in the most preferred delivery format.

17. The method of claim 1, wherein an information delivery format comprises at least one of a language and a comprehension level.

18. The method of claim 1, wherein an information delivery format comprises at least one of an audio, textual, symbolic, and video format.

19. The method of claim 1, wherein delivering the information to the user includes at least one or displaying the information on an electronic display and audibly communicating the information via a speaker.

20. The method of claim 19, further comprising selecting at least one of a text size and a volume based on the information delivery format indication, wherein displaying the information on an electronic display comprises displaying the information with the selected text size and audibly communicating the information via a speaker comprises audibly communicating the information at the selected volume.

21. The method of claim 1, wherein delivering the information to the user comprises delivering the selected file to the user device for delivery to the user via the user device.

22. The method of claim 1, further receiving information via a computer network, wherein selecting the file comprises selecting the file based on the received information and the information delivery format indication.

23. The method of claim 22, further comprising incorporating the received information into the selected file.

24. The method of claim 22, wherein receiving the information comprises receiving information stored in a user file.

25. A device comprising:
a memory to store information in a plurality of files, wherein each of the plurality of files contains the information in a different information delivery format;
an input/output circuit; and
a processor to wirelessly detect a user device and wirelessly receive an indication of an information delivery format for a user of the user device from the user device via the input/output circuit, select a file from the plurality of files stored in the memory based on the information delivery format indicated for the user, and deliver the information to the user of the user device using an information delivery format associated with the selected file.

26. The device of claim 25, wherein the memory is local.

27. The device of claim 25, wherein the device comprises a message board.

28. The device of claim 25, wherein the user device includes radio frequency identification (RFID) tag, wherein the input/output circuit includes an RFID tag reader that interrogates the RFID tag, receives a response from the RFID tag, and delivers the response to the processor, and wherein the processor detects the user device based on the response and extracts the information delivery format indication from the response.

29. The device of claim 25, wherein the user device includes a barcode, wherein the input/output circuit includes a barcode reader that reads data from the barcode and delivers the data to the processor, and wherein the processor detects the user device when it receives the data and extracts the information delivery format indication from the data.

30. The device of claim 25, wherein the user device includes a magnetic tag, wherein the input/output circuit includes a magnetic tag reader that reads data from the magnetic tag and delivers the data to the processor, and wherein the processor detects the user device when it receives the data and extracts the information delivery format indication from the data.

31. The device of claim 25, wherein the input/output circuit comprises a transceiver, and wherein the processor communicates with the user device via a local wireless communication channel between the input/output circuit and the user device.

32. The device of claim 31, wherein the local wireless communication channel comprises at least one of a radio frequency communication channel and an infrared communication channel.

33. The device of claim 31, wherein the processor establishes a communication session with the user device via the input/output circuit and the local wireless communication channel, receives a message from the user device via the local wireless communication channel, and extracts the information delivery format indication from the message.

34. The device of claim 33, wherein the processor identifies available information delivery formats associated with the plurality of files in which the information is stored in the memory, sends a first message to the user device prompting the user to select one of the available information delivery formats, and receives a second message from the user device that indicates a user selection.

35. The device of claim 25, wherein the processor identifies an information delivery format based on the received information delivery format indication, determines whether any file of the plurality of files contains the information in the identified information delivery format, and selects the file as a function of the determination.

36. The device of claim 35, wherein the processor determines that no file of the plurality of files contains the information in the identified information delivery format, and sends a message indicating that the information is not available in the identified information delivery format to the user device.

37. The device of claim 35, wherein the processor determines that no file in the plurality of files contains the information in the identified delivery format, and selects a file that contains the information in a delivery format closest to the identified information delivery format.

38. The device of claim 25, wherein the processor compares the received information delivery format indication to format fields of the plurality of files, and selects the file as a function of the comparison.

39. The device of claim 25, wherein the processor receives an information delivery format indication that includes a listing of multiple delivery formation and associated preferences, and selects a file that contains the information in the most preferred delivery format.

40. The device of claim 25, wherein a delivery format includes at least one of a language and a comprehension level.

41. The device of claim 25, wherein a delivery format includes at least one of an audio, textual, symbolic, and video format.

42. The device of claim 25, further comprising a user interface, wherein the processor delivers the information to the user via the user interface.

43. The device of claim 42, wherein the user interface includes at least one of an electronic display and a speaker.

44. The device of claim 42, wherein the processor selects at least one of a text size and a volume based on the information delivery format, and delivers the file using at least one of the selected text size and volume.

45. The device of claim 25, wherein the processor delivers the selected file to the user device via the input/output circuit for delivery of the information to the user.

46. The device of claim 25, wherein the processor receives information via a computer network, and selects the file based on the received information and the information delivery format indication.

47. The device of claim 46, wherein the processor incorporates the received information into the selected file.

48. The device of claim 46, wherein the processor receives the information from a user file.

49. A method comprising:
establishing a communication session with an information device via a local wireless communication channel;
sending a message to the information device that indicates an information delivery format for a user;
receiving a file containing information in the indicated format from the information device; and
delivering the information to the user in the indicated format.

50. The method of claim 49, wherein the message is a first message, the method further comprising:
receiving a second message from the information device indicating available information delivery formats;

displaying the available information delivery formats to the user via a user interface;

receiving a user selection via the user interface; and sending the first message to the information device indicating the user selection.

51. The method of claim 49, wherein the local wireless communication channel comprises at least one of a radio frequency communication channel and an infrared communication channel.

52. A method comprising:

receiving an indication of an information delivery format for a user from a portable user device via a data cable;

selecting a file that contains information from a plurality of files stored in a memory, each of the files containing the information in a respective one of a plurality of information delivery formats, based on the indication; and delivering the selected file to the user device via the data cable for delivery of the information to the user.

53. The method of claim 52, wherein the memory is a local memory.

54. The method of claim 52, wherein the user device comprises at least one of a cellular telephone and a personal digital assistant (PDA).

55. The method of claim 52, wherein the data cable is a serial data cable.

56. A device comprising:

a memory to store information in a plurality of files, wherein each of the plurality of files contains the information in a different information delivery format;

a data port to receive a data cable; and a processor to receive an indication of an information delivery format for a user from a portable user device via the data cable, select a file from the plurality of files stored in the memory based on the indication, and deliver the selected file to the user device via the data cable for delivery of the information to the user.

57. The device of claim 56, wherein the memory is local.

58. A method comprising:

establishing a communication session with an information device via a data cable and a portable user device;

sending a message to the information device that indicates an information delivery format for a user of the portable user device;

receiving a file containing information in the indicated format from the information device; and delivering the information to the user in the indicated format.

59. The method of claim 58 wherein the message is a first message, the method further comprising:

receiving a second message from the information device indicating available information delivery formats;

displaying the available information delivery formats to the user via a user interface;

receiving a user selection via the user interface; and sending the first message to the information device indicating the user selection.

* * * * *

UNITED STATES PATENT AND TRADEMARK OFFICE
CERTIFICATE OF CORRECTION

| | |
|---|---|
| PATENT NO. | : 7,046,137 B2 |
| APPLICATION NO. | : 10/280296 |
| DATED | : May 16, 2006 |
| INVENTOR(S) | : Robert D. Palmquist |

It is certified that error appears in the above-identified patent and that said Letters Patent is hereby corrected as shown below:

The following statement should be added to this patent immediately after the title in column 1:

"This invention was made with government support under contracts N00014-01-M-0225, N00014-02-C-0122 and N00014-02M-0224 awarded by the Office of Naval Research. The government has certain rights in the invention."

column 16, line 54 (claim 19), "or" should read - - of - -

Signed and Sealed this

Fifth day of September, 2006

JON W. DUDAS
*Director of the United States Patent and Trademark Office*